United States Patent
Soysa et al.

(10) Patent No.: US 8,965,800 B2
(45) Date of Patent: Feb. 24, 2015

(54) SYSTEMS, METHODS, AND COMPUTER READABLE MEDIA FOR CONDUCTING AN ELECTRONIC TRANSACTION VIA A BACKEND SERVER SYSTEM

(71) Applicant: MasterCard International Incorporated, Purchase, NY (US)

(72) Inventors: Gamaethige Francis Robert Sulak Soysa, San Jose, CA (US); Mohammad Khan, San Jose, CA (US); Mikel Robert Delagrange, Suwanee, GA (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/793,813

(22) Filed: Mar. 11, 2013

(65) Prior Publication Data

US 2013/0238456 A1 Sep. 12, 2013

Related U.S. Application Data

(60) Provisional application No. 61/609,048, filed on Mar. 9, 2012.

(51) Int. Cl.
| | |
|---|---|
| *G06Q 20/20* | (2012.01) |
| *G06Q 20/32* | (2012.01) |
| *H04L 29/06* | (2006.01) |
| *G06Q 20/38* | (2012.01) |
| *H04L 29/12* | (2006.01) |

(52) U.S. Cl.
CPC .......... *G06Q 20/327* (2013.01); *G06Q 20/3278* (2013.01); *G06Q 20/3276* (2013.01); *G06Q 20/3223* (2013.01); *H04L 63/00* (2013.01); *G06Q 20/3821* (2013.01); *H04L 61/00* (2013.01)
USPC .......................................................... 705/30

(58) Field of Classification Search
CPC ........ G06Q 20/20; G06Q 20/32; G06Q 20/40
USPC .......................................................... 705/30
See application file for complete search history.

(56) References Cited

U.S. PATENT DOCUMENTS

| 7,469,151 B2 | 12/2008 | Khan et al. |
| 8,740,073 B2 | 6/2014 | Vijayshankar et al. |

(Continued)

FOREIGN PATENT DOCUMENTS

| EP | 1 501 038 A1 | 1/2005 |
| KR | 10-2003-0080111 | 10/2003 |

(Continued)

OTHER PUBLICATIONS

Notice of Allowance and Fee(s) Due for U.S. Appl. No. 12/184,847 (Dec. 23, 2013).

(Continued)

*Primary Examiner* — Shay S Glass
(74) *Attorney, Agent, or Firm* — Jenkins, Wilson, Taylor & Hunt, P.A.

(57) ABSTRACT

A method for conducting an electronic transaction with a backend server system includes interfacing a mobile device with a touch point to wirelessly obtain a backend server system address and an identification code. The touch point is associated with an electronic transaction terminal device to be utilized by a user of the mobile device to conduct an electronic transaction. Communication is established between the mobile device and the backend server system. The identification code and a mobile device identifier associated with the mobile device are received. It is determined whether one or more electronic certificates associated with the mobile device identifier are applicable for use in the electronic transaction. The identification code is used to provide at least one of the applicable electronic certificates to the terminal device and applying the at least one applicable electronic certificate to the electronic transaction.

35 Claims, 2 Drawing Sheets

(56) References Cited

U.S. PATENT DOCUMENTS

| | | | |
|---|---|---|---|
| 2004/0072592 A1 | 4/2004 | Hasegawa | |
| 2004/0243519 A1 | 12/2004 | Perttila et al. | |
| 2005/0070257 A1 | 3/2005 | Saarinen et al. | |
| 2006/0165060 A1 | 7/2006 | Dua | |
| 2006/0236325 A1 | 10/2006 | Rao et al. | |
| 2006/0287964 A1 | 12/2006 | Brown | |
| 2007/0042756 A1 | 2/2007 | Perfetto et al. | |
| 2007/0099599 A1 | 5/2007 | Smith et al. | |
| 2007/0152829 A1 | 7/2007 | Lindsay et al. | |
| 2007/0203792 A1 | 8/2007 | Rao | |
| 2007/0241183 A1 | 10/2007 | Brown et al. | |
| 2008/0040354 A1 | 2/2008 | Ray et al. | |
| 2008/0058014 A1 | 3/2008 | Khan et al. | |
| 2008/0183722 A1 | 7/2008 | Lane et al. | |
| 2008/0257958 A1 | 10/2008 | Rothwell et al. | |
| 2009/0144161 A1 | 6/2009 | Fisher | |
| 2009/0164322 A1 | 6/2009 | Khan et al. | |
| 2009/0192912 A1 | 7/2009 | Griffin et al. | |
| 2009/0193500 A1 | 7/2009 | Griffin et al. | |
| 2010/0030636 A1 | 2/2010 | Vijayshankar | |
| 2010/0075666 A1 | 3/2010 | Garner | |
| 2010/0161410 A1 | 6/2010 | Tulloch | |
| 2010/0185504 A1 | 7/2010 | Rajan et al. | |
| 2011/0060637 A1 | 3/2011 | Sakai et al. | |
| 2011/0106635 A1 | 5/2011 | Khan et al. | |
| 2011/0307318 A1 | 12/2011 | LaPorte et al. | |
| 2011/0320293 A1* | 12/2011 | Khan | 705/16 |

FOREIGN PATENT DOCUMENTS

| | | |
|---|---|---|
| KR | 10-2004-0000712 | 1/2004 |
| KR | 10-2006-0097187 A | 9/2006 |
| KR | 10-2008-0021436 A | 3/2008 |
| WO | WO 2008/030307 A2 | 3/2008 |
| WO | WO 2011/112158 A1 | 9/2011 |
| WO | WO 2012/006098 A2 | 1/2012 |

OTHER PUBLICATIONS

Notification of Transmittal of the International Search Report and the Written Opinion of the International Searching Authority, or the Declaration for International Application No. PCT/US2013/030216 (Jun. 20, 2013).

Extended European Search Report for European Patent Application No. 09803712.0 (Mar. 19, 2013).

Final Official Action for U.S. Appl. No. 12/184,847 (Dec. 19, 2012).

Non-Final Official Action for U.S. Appl. No. 12/184,847 (Jun. 19, 2012).

Final Official Action for U.S. Appl. No. 12/184,847 (Jul. 30, 2010).

Interview Summary for U.S. Appl. No. 12/184,847 (May 5, 2010).

Notification of Transmittal of the International Search Report and the Written Opinion of the International Searching Authority, or the Declaration for International Application No. PCT/US2009/052618 (Mar. 30, 2010).

Official Action for U.S. Appl. No. 12/184,847 (Jan. 6, 2010).

Aigner et al., "A System of Secure Virtual Coupons Using NFC Technology," Proceedings of the Fifth Annual IEEE International Conference on Pervasive Computing and Communications Workshops, pp. 1-6 (2007).

"Information technology—Telecommunications and information exchange between systems—Near Field Communications—Interface and Protocol (NFCIP-1)," ISO/IEC 18092, pp. 1-66 (Apr. 1, 2004).

"Indentification cards—Contactless integrated circuit(s) cards—Proximity cards—Part 2: Radio frequency power and signal interface," ISO/IEC 14443-2, pp. 1-10 (Jul. 22, 2003).

"Identification cards— Contactless integrated circuit(s) cards—Proximity cards—Part 4: Transmission protocol," ISO/IEC 14443-4, pp. 1-39 (Mar. 10, 2000).

"Identification cards—Contactless integrated circuit(s) cards—Proximity cards—Part 3: Initialization and anticollision," ISO/IEC 14443-3, pp. 1-48 (Jun. 11, 1999).

Non-Final Office Action for U.S. Appl. No. 13/171,128 (May 22, 2014).

Final Office Action for U.S. Appl. No. 13/171,128 (Oct. 23, 2013).

Communication of European Publication Number and Information on the Application of Article 67(3) EPC for European Patent Application No. 11804135.9 (Apr. 4, 2013).

Non-Final Office Action for U.S. Appl. No. 13/171,128 (Mar. 1, 2013).

Notification of Transmittal of the International Search Report and the Written Opinion of the International Searching Authority, or the Declaration for International Application No. PCT/US2011/042207 (Jan. 2, 2012).

* cited by examiner

SYSTEMS, METHODS, AND COMPUTER READABLE MEDIA FOR CONDUCTING AN ELECTRONIC TRANSACTION VIA A BACKEND SERVER SYSTEM

PRIORITY CLAIM

This application claims the benefit of U.S. Provisional Patent Application Ser. No. 61/609,048, filed Mar. 9, 2012; the disclosure of which is incorporated herein by reference in its entirety.

TECHNICAL FIELD

The subject matter described herein relates to electronic payment and non-payment transactions. More particularly, the subject matter described herein relates to systems, methods, and computer readable media for conducting an electronic transaction via a backend server system.

BACKGROUND

Payments, loyalty transactions, and coupon redemptions are typically conducted at point of sale (POS) environments using paper currency, plastic cards, and/or manual entry of keys via traditional network connections that utilize dial up lines, Internet connections and/or wireless networks provided by merchants or merchant service providers. However, there is a growing trend of conducting these types of transactions using a mobile device (e.g., a smart phone). In order to allow consumers to make payments, send loyalty information, or redeem coupons/offers from mobile devices (at a merchant point of sale (POS), a merchant entity may be compelled to install a near field communications (NFC) reader and/or a barcode reader. Specifically, the merchant entity may integrate the NFC reader with point of sale system to be able to accept payment, loyalty transactions, coupons/offers, and other transactional data. However, this solution not only requires a merchant to incur expensive equipment costs related to the installation of an NFC reader at each POS terminal location, but the merchant may also have to take expensive, disruptive, and time consuming measures to enable their existing POS software to fully function with the NEC reader to wirelessly accept electronic payment, loyalty, coupons/offers, and the like. Although merchants want to accept transactions initiated from mobile devices, the significant investment of time and money required to add an NEC reader is preventing a number of merchant entities from providing better service to mobile device-using customers.

Accordingly, in light of these disadvantages, there exists a need for systems, methods, and computer readable media for conducting an electronic transaction via a backend server system.

SUMMARY

According to one aspect, the subject matter described herein relates to systems, methods, and computer readable media for conducting an electronic transaction via a backend server system. In one embodiment, a method includes interfacing a mobile device with a touch point to wirelessly obtain a backend server system address and an identification code, wherein the touch point is associated with an electronic transaction terminal device to be utilized by a user of the mobile device to conduct an electronic transaction and the identification code is associated with the electronic transaction terminal device or the touch point. The method also includes establishing communication between the mobile device and the backend server system using the backend server system address, receiving, at the backend server system from the mobile device, the identification code and a mobile device identifier associated with the mobile device, and determining, at the backend server system, whether one or more electronic certificates associated with the mobile device identifier are applicable for use in the electronic transaction. The method further includes using, at the backend server system, the identification code to provide at least one of the applicable electronic certificates to the electronic transaction terminal device and applying, at the electronic transaction terminal device, the at least one applicable electronic certificate to the electronic transaction.

The subject matter described herein may be implemented in hardware, software, firmware, or any combination thereof. As such, the terms "function", "node", or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for conducting an electronic transaction via a backend server system are disclosed. The present subject matter provides a low cost solution for conducting near field communications (NEC) based transactions within an existing point of sale (POS) or point of service environment without the utilization of an NFC wireless device reader. NEC may include any wireless communications conducted at, for example, ISO 14443 and ISO 18092 interfaces.

Figure 1:
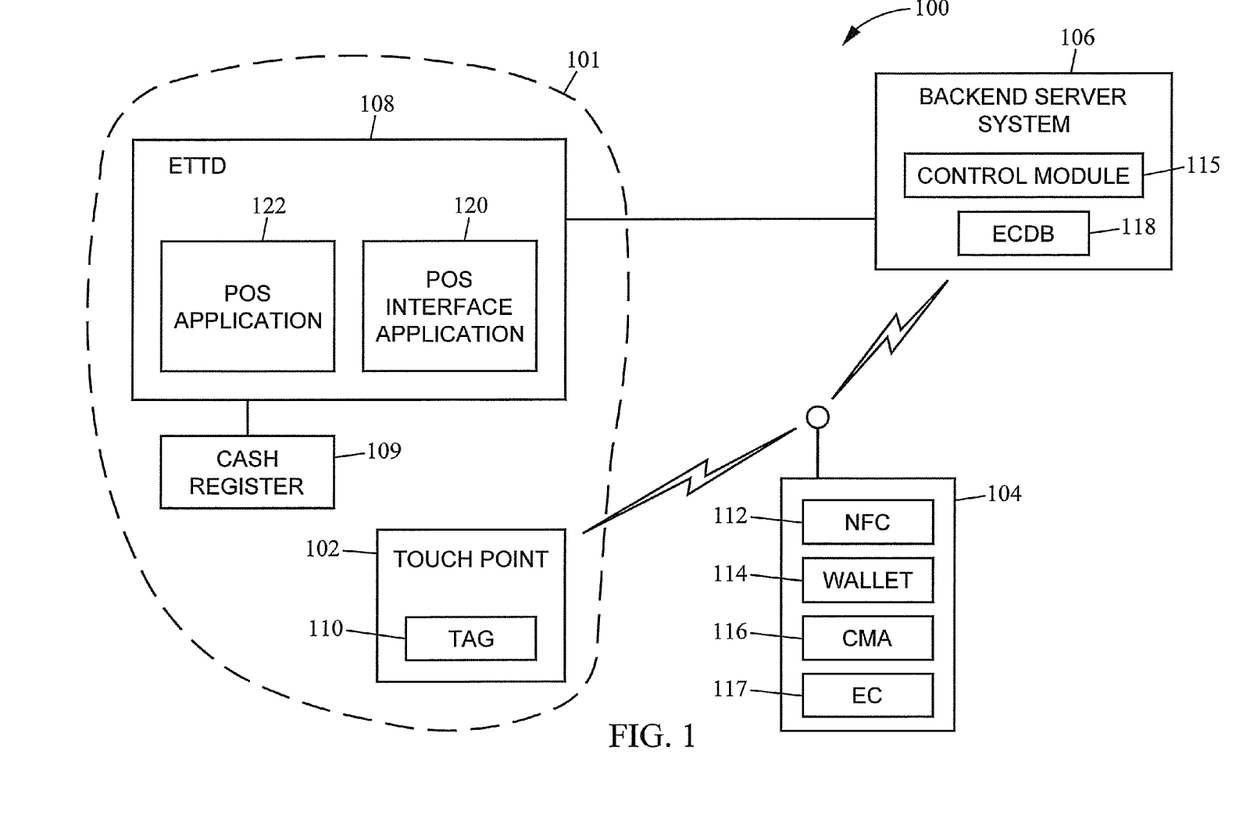
FIG. 1 is a block diagram illustrating an exemplary system for conducting an electronic transaction via a backend server system according to an embodiment of the subject matter described herein.

FIG. 1 depicts an exemplary system 100 that includes a touch point 102, a mobile device 104, a backend server system 106, an electronic transaction terminal device 108, and a cash register 109. Notably, touch point 102 and electronic transaction terminal device 108 may be associated with each other and co-located (e.g., in relative close proximity) at a common location or area 101 (e.g., same store, same point of sale counter, same kiosk, etc.). Cash register 109 may also be located in common area 101. Although the following disclosure describes a point of sale (POS) setting and a payment transaction, the systems and methods described herein may also be utilized to conduct a non-payment transaction (or a combination of a payment and non-payment transaction) without departing from the scope of the present subject matter.

Referring to FIG. 1, mobile device 104 may comprise a smartphone, a personal digital assistant (PDA), a tablet computer, or any other portable computing device. In some embodiments, mobile device 104 may include a near field communications (NEC) module or chipset 112, a mobile wallet application 114, one or more customer mobile applications 116, and a local storage including one or more electronic certificates 117 (or electronic certificate identifiers associated with electronic certificates stored in backend server system 106). NEC module 112 may include any circuit component that enables mobile device 104 to communicate with passive NEC enabled devices (e.g., an unpowered NEC smart tag) or active NEC enabled devices (e.g., a powered NEC wireless reader) via NEC. In one embodiment, an authentication process to authenticate mobile device 104 may be conducted between NEC module 112 and NEC tag 110. Mobile wallet application 114 includes a software based application that may be configured to manage and utilize the one or more customer mobile applications 116 (e.g., mobile device applications). In some embodiments, customer mobile application 116 may include a software based application that is configured to enable mobile device 104 to conduct a transaction with a particular point of sale, point of service, and/or point of interest. For example, an exemplary customer mobile application 116 (e.g., mobile device applications) may include a retail POS application, a healthcare service point application, a transportation service point application, a government service point application, an enterprise service point application, a support service point application, a kiosk service point application, an access control service point application, a banking service point application, an automatic teller machine (ATM) service point application, a boarding pass service point application, and an entertainment service point application. In one embodiment, an authentication process to authenticate mobile device 104 may be conducted between consumer mobile application 116 and NFC tag 110.

Similarly, mobile wallet application 114 may also be configured to manage and utilize the one or more electronic certificates 117. In some embodiments, electronic certificates include electronic coupons, electronic loyalty cards, electronic offers, electronic payment cards, electronic credit cards (open loop and/or closed looped), electronic event or ride tickets, electronic rewards, a digital receipt, a payment identifier, a boarding pass, an electronic check-in identifier, an electronic hotel key, a membership card/key, an electronic gift card, an electronic prepaid card, an electronic business card, and the like.

In some embodiments, touch point 102 may include any device or article configured to provide information (e.g., an identifier or identification code) to an interfacing mobile device (e.g., mobile device 104). For example, touch point 102 can comprise a smart poster that includes a tag 110 that may be NFC enabled (e.g., an NFC smart tag) and wirelessly provide information to an interfacing mobile device 104 equipped with an NFC chipset 112. Alternatively, tag 110 on touch point 102 may include a QR code or a barcode that may be scanned by a camera (not shown) or like device equipped on mobile device 104.

In some embodiments, touch point 102 is positioned in close proximity to an electronic transaction terminal device 108 and is easily accessible to a customer. Tag 110 on touch point 102 may include identification information that is related or associated to electronic transaction terminal device 108 and/or the specific point of sale location (e.g., area 101). Specifically, tag 110 may be programmed or encoded with an identifier or an identification code that can be directly or indirectly associated with that specific electronic transaction terminal device/location, touch point 102 itself, and/or a mobile device payment/loyalty/offer application that is supported in a backend server system 106 that is communicatively connected to the electronic transaction terminal device 108. For example, tag 110 may be configured to contain an identification code or identifier associated with electronic transaction terminal device 108. Alternatively, the identification code or identifier may include a touch point identifier that is mapped to an electronic transaction terminal device identifier (e.g., such mappings may be stored in backend server system 106), an application identifier (e.g., identifier for customer mobile application 116), a banking terminal device identifier, an automatic teller machine (ATM) terminal device identifier, and/or a backend server system identifier.

As mentioned above, tag 110 may include a passive NEC tag. As used herein, the terms "passive tag" and "NEC passive tag" refers generally to a passive NEC or RF tag device that is powered by an interfacing NFC-enabled device. For example, after an NFC-enabled device is brought in close proximity to create an interface with an NEC passive tag, the NEC passive tag may be activated by obtaining power from the electromagnetic field generated by the NFC-enabled device. For example, an NEC passive tag can be capable of communicating a variety of information that may include, but is not limited to, a location identifier, such as a uniform resource locator (URL), internet protocol (IP) address, or a uniform resource identifier (URI), tag identification number, other identification numbers, or the like. In some embodiments, the communicated information may be associated with or identify touch point 102, electronic transaction terminal 108, or backend server system 106.

Although depicted in FIG. 1 as a single entity, backend server system 106 may comprise one or more computer servers that are configured to help facilitate an electronic transaction conducted between mobile device 104 and electronic transaction terminal device 108. As used herein, an electronic transaction may include a wireless payment and/or non-payment transaction that is conducted in part using a wireless mobile device. To conduct such an electronic transaction, the mobile device may utilize one or more electronic certificates or softcards (e.g., electronic and/or virtual based credit cards, coupons, loyalty cards, etc. that are stored locally in the mobile device or on a backend network server). The electronic transaction may also include, in part, a purchase transaction that occurs when a mobile device user presents, for example, a good for purchase at a physical point of sale (e.g., a cash register).

In some embodiments, backend server system 106 may include one or more of: a trigger management server (TMS), a content management server (CMS), a content provider server, an electronic certificate repository (e.g., electronic certificate database 118), and an over the air (OTA) provisioning server. Backend server system 106 may include a control module 115 that is responsible for the management and operation of backend server system 106. Control module 115 may also be configured to authenticate mobile device 104 prior to conducting a transaction. For example, control module 115 in backend server system 106 may use the mobile device identification code (or mobile subscriber number/identifier) to authenticate mobile device 104. Backend server system 106 may also include an electronic certificate database that includes a plurality of various electronic certificate identifiers mapped to a plurality of mobile device identifiers (or mobile subscriber identifiers/numbers). In some embodiments, backend server system 106 is further configured to include the electronic certificates associated with the plurality of electronic certificate identifiers. In some embodiments, backend server system 106 may also include a database (not shown) that contains entries of mappings between a plurality of touch point identifiers and a respective plurality of electronic transaction terminal devices. In one embodiment, backend server system 106 may be communicatively coupled (e.g., either wired or wirelessly) to electronic transaction terminal device 108. Similarly, mobile device 104 may communicate with backend server system 106 using WiFi, cellular/wireless communications (e.g., 3G, 4G, long term evolution (LTE), etc.), or any other emerging wireless communications.

Referring to FIG. 1, electronic transaction terminal device 108 may include a point of sale terminal device, a point of service terminal device, a point of interaction (POI) terminal device, a banking terminal device, an automatic teller machine (ATM) terminal device, and the like. In some embodiments, electronic transaction terminal device 108 may be located at a store, a taxi cab, a vending machine, a kiosk, and the like. Notably, electronic transaction terminal device 108 may include a POS interface application 120 and a POS application 122. In one embodiment, each of POS interface application 120 and POS application 122 includes a special software module or application that is executed by a hardware processor included in electronic transaction terminal device 108. When executed, POS interface application 120 may communicate with customer mobile application 116 (e.g., mobile device application) using a secured channel directly or indirectly via backend server system 106 (e.g., over an Internet protocol network). In one embodiment, POS interface application 120 may reside in a DOS, Windows, or Android/Linux operating system computer that is configured to communicate with backend server system 106 via an IP network, a cellular/wireless network, or a leased/dedicated line using web services, XML, or a proprietary application programming interface (API).

In addition, POS interface application 120 may communicate with POS application 122 using a driver (e.g., UPOS, oPOS or jPOS application software), native mode, or emulation mode to compel electronic transaction terminal device 108 to communicate with backend server system 106 to identify whether electronic certificates, loyalty programs, and the like should be applied to an electronic transaction being conducted (see details below). In some embodiments, mobile device 104 may communicate with electronic transaction terminal device 108 using WiFi, cellular/wireless communications (e.g., 3G, 4G, long term evolution (LTE), etc.), or other emerging wireless communications.

In one embodiment, a customer (e.g., mobile device user) utilizes mobile device 104 provisioned with a supported customer mobile application 116 (e.g., from a retailer, from a service provider, or from companies supporting cloud based payments, like Google, Paypal, Mastercard, etc.) at a point of sale register to initiate a purchase transaction of one or more items. Although the following example describes a purchase and/or payment transaction, other electronic transactions may be conducted without departing from the scope of the present subject matter. For example, the electronic transaction being conducted may include at least one of a loyalty transaction, a coupon redemption transaction, an offer redemption transaction, a digital receipt pickup transaction, an electronic coupon pickup transaction, an electronic coupon pickup transaction, a reward pickup transaction, a one-touch checkout transaction, an order transaction, and a non-payment transaction. Other exemplary electronic transactions includes a combination of payment and non-payment transaction, an electronic certificate delivery transaction, a printing advice transaction, an access control transaction, a boarding pass transaction, and an electronic certificate redemption transaction.

In this example, electronic transaction terminal device 108 is not equipped with an NEC reader and is located proximate to touch point 102 within a common area/location 101. The mobile device user may interface or "tap" mobile device 104 with an NFC smart tag 110 of touch point 102 in order to obtain, via NEC, an identification code identifying electronic transaction terminal device 108 and an address (e.g., a URL or IP address) associated with backend server system 106. Mobile device 104 may then be configured to use the address to wirelessly transmit the identification code and a mobile device identifier (or a mobile subscriber identifier) which identifies mobile device 104 to backend server system 106. Specifically, the NEC tap informs backend server system 106 that a specific customer has interfaced mobile device 104 with a touch point 102 associated with a specific electronic transaction terminal device 108 or point of sale location/area 101. Backend server system 106 may then utilize the identification code to establish communications with electronic transaction terminal device 108.

After mobile device 104 has interfaced with touch point 102, a sales clerk may use checkout cash register 109 to register/scan the items the customer is attempting to purchase. As an item is scanned, POS application 122 (via POS interface application 120) may communicate the item information to backend server system 106. In addition, POS application 122 may compel electronic transaction terminal device 108 to identify if there are any applicable electronic certificates (e.g., coupons/offers/promotions/etc.) available in backend system server 106 (e.g., in an online repository or in electronic certificate database 118) which can be applied to the purchase transaction based on a mobile device identifier and the type products the mobile device user has presented for purchase.

Specifically, electronic certificates may be stored on the backend in a cloud based manner. For example, electronic certificate database 118 may include a plurality of electronic certificates and/or a plurality of electronic certificate identifiers. In some embodiments, the electronic certificates and identifiers may be mapped to mobile device identifiers or some other identifier (e.g., a loyalty program identifier/number, a membership identifier, a customer identifier etc.). The terms "tap," "NFC tap," and "interface" can be used to mean the same actions. As used herein, the terms "tap" and "NFC tap," in reference to NFC-enabled devices and wireless transceivers such as device readers or NFC passive tags, means to provide a close or near field interface between an NFC-enabled device and a wireless transceiver.

In some embodiments, mobile device 104 may be configured to only provide customer identification information (e.g., a mobile device identifier) to backend server system 106 since payment, loyalty, coupons/offers and other data may be stored in the cloud corresponding to the identification information. Similarly, the electronic certificates and identifiers may also be mapped to identifiers that are associated with goods or services that may be scanned/registered at a point of sale (e.g., cash register 109). Thus, when a customer has an item for purchased scanned at the point of sale, electronic transaction terminal device 108 may provide an associated product identifier to backend server system 106. Backend server system 106 may then query database 118 to determine if any electronic certificates correspond to the product identifier and/or an identifier corresponding to the customer (e.g., a loyalty membership identifier or a mobile device identifier).

In some embodiments, POS application 122 may also compel electronic transaction terminal device 108 to identify if there is a loyalty program that a merchant (e.g., a merchant associated with electronic transaction terminal device 108 or a manufacturer of a product being purchased) is conducting and/or a loyalty program where the customer is currently a registered member. If either is true, backend server system 106 may provide the applicable electronic certificates and/or loyalty program information to POS interface application 120. Electronic transaction terminal device 108 may subsequently apply the received electronic certificates and/or loyalty program information to the purchase transaction.

In some embodiments, POS application 122 may send the resulting payment amount of the purchase transaction to mobile device 104 for display on the customer's mobile device screen. POS application 122 may also subsequently request the customer to select a payment option. If the payment amount exceeds a certain value (e.g., a predefined threshold value), customer mobile application 116 may prompt the mobile device user to enter a PIN or password. In some embodiments, consumer payment information is sent to electronic transaction terminal device 108 based on the payment type selected by the mobile device user. The payment information may be open loop or closed loop payment information (e.g., track 1 and 2 data, or EMV data) or a payment card identifier that is associated with a cloud based payment card that is stored in backend server system 106.

Once payment is received and accepted, POS application 122 may send a payment confirmation and transaction completion message to mobile device 104 (e.g., via SMS, email, a wireless signal, and the like). POS application 122 may also be configured to optionally send a digital receipt to mobile device 104 in a similar manner. In one embodiment, mobile device 104 may be configured to provide an email address to backend server system 106 upon interfacing with touch point 102 located at or near the electronic transaction terminal device 108. Backend server system 106 may then communicate the email address to the electronic transaction terminal device being used by the mobile device user conducting the electronic purchase transaction. Upon completion of the purchase transaction, electronic transaction terminal device 108 may utilize the email address (associated with the mobile device user) to deliver a digital receipt to the mobile device user.

In an alternate embodiment, a phone number or a digital receipt repository address/identifier associated with the mobile device user may be provided to electronic transaction terminal device 108 in lieu of an email address. Similarly, an electronic business card or membership card containing at least one of an email address, mobile phone number, and digital receipt repository address may be provided. In addition, instead of providing the email address to backend server system 106 communicating with electronic transaction terminal device 108, the email address may be provided directly to a mobile or stationary electronic transaction terminal device 108.

In an alternate embodiment, POS application 108 may optionally send electronic certificates (e.g., electronic coupons and/or offers) to the customer while sending a copy of the electronic certificates to database 118 or an online repository associated with the customer. POS application 108 may also optionally send an updated loyalty points message and/or a thank you message (e.g., via SMS, email, a wireless signal, etc.) to the mobile device user at the conclusion of the transaction.

In an alternate embodiment, the present subject matter may be utilized in cooperation with an NFC reader. In such a scenario, customer mobile application 116 on mobile device 104 may send payment information, optional loyalty card number information, electronic coupons/offers data, and ordering information (e.g., if applicable in a pre-order fast food environment) to electronic transaction terminal device 108. Specifically, POS application 122 at electronic transaction terminal device 108 may receive this information from NFC enabled mobile device 104 through an NFC reader (not shown) attached to electronic transaction terminal device 108. POS application 122 may then complete the purchase transaction and confirm the transaction by sending a message to customer mobile application 116. In one embodiment, POS application 122 may send a digital receipt and electronic certificates (e.g., electronic coupons/offers/loyalty points) back to customer mobile application 116.

In some embodiments, POS application 122 may query backend server system 106 to determine if there is any information previously provided by the customer via mobile device 104. If true, then payment, loyalty, and/or coupons/offers will be requested by backend server system 106 from a third party service provider (not shown) that is responsible for maintaining payment, loyalty, and coupons/offers associated with mobile device 104 or the mobile device user. The electronic certificate information will then be forwarded to electronic transaction terminal device 108 to reconcile the customer's shopping basket based on coupons/offers in addition to applying loyalty information and accepting payments. To provide additional security to the payment transaction, a customer may be asked to enter a PIN on mobile device 104 which is securely transferred to backend server system 106 to assure that NEC enabled mobile device 104 is being used by the rightful owner.

In one embodiment, mobile device 104 may conduct a transaction utilizing one or more electronic certificates 117 (or electronic certificate identifiers) that are stored locally. In such a scenario, mobile device 104 may be interfaced with touch point 102, which is associated and co-located in area 101 with electronic transaction terminal device 108. Upon interfacing, mobile device 104 may obtain a touch point identification code (or an identifier associated with electronic transaction terminal device 108) from tag 110 on touch point 102. Upon receiving the identification code, customer mobile application 116 on mobile device 104 may be selected or triggered to provide (e.g., pushes) the touch point identification code, a mobile device identifier, and an electronic certificate identifier (e.g., a coupon code) to backend server system 106. Backend server system 106 may query a database that maps touch point identification codes to electronic transaction terminal devices to determine the location of electronic transaction terminal device 108. Backend server system 106 subsequently provides the electronic certificate (or electronic certificate identifier) to POS interface application 120 over IP or a wireless network. POS interface application 120 provides the electronic certificate to POS application 122, which applies the electronic certificate (e.g., a coupon code) to the purchase transaction, adjusts the purchase amount, and prompts the mobile device user (e.g., via mobile device 104) for payment. A customer may provide payment by swiping, tapping, or inserting a payment card and/or mobile device at electronic transaction terminal device 108. Thus, a coupon redemption based transaction may be completed without requiring an NEC reader. A customer can also complete payment and loyalty transactions using the similar approach along with or without a coupon or offer redemption.

In one embodiment, instead of interfacing with a touch point, mobile device 104 may utilize WiFi, Bluetooth, GPS, cellular triangulation, WiFi triangulation or some other vicinity determining wireless technology of mobile device 104 to link its physical presence near a service point (e.g., electronic transaction terminal device 108 or the point of sale location). For example, a mobile device may enter a specific zone or range designated by a vicinity determining device (e.g., a mobile device detection server that is located in area 101, GPS satellites, cellular towers, etc.). The vicinity determining device detects the proximate mobile device and links the mobile device's presence to the service point (e.g., a nearby electronic transaction terminal device 108). If this occurs, the vicinity determining device may read the mobile subscriber identifier from mobile device 104 and provide the information to backend server system 106. Alternatively, mobile device 104 may wirelessly receive, from the vicinity determining device, an identifier associated with the point of sale location/device (e.g., electronic transaction terminal device 108) which is provided to backend server system 106 by mobile device 104. After this detection process is conducted, a transaction may be conducted in the same manner described above.

Figure 2:
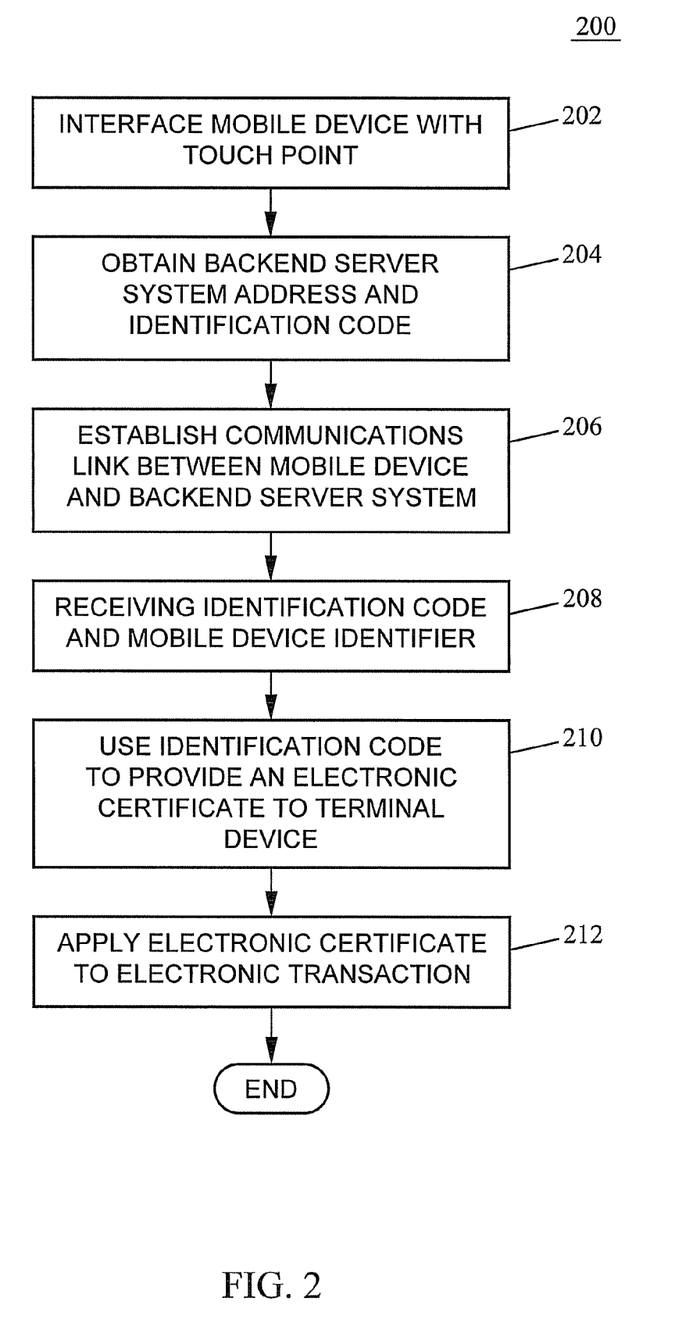
FIG. 2 is a flow chart illustrating an exemplary process for conducting an electronic transaction via a backend server system according to an embodiment of the subject matter described herein.

FIG. 2 is a flow chart illustrating an exemplary method 200 for conducting an electronic transaction via a backend server system according to an embodiment of the subject matter described herein. In step 202, a mobile device is interfaced with a touch point. In one embodiment, an NFC enabled mobile device is interfaced with a smart poster that includes a smart tag. Notably, the touch point is associated with an electronic transaction terminal device. Both the touch point and the electronic transaction terminal may be located in a common area along with a cash register that the customer (i.e., mobile device user) is conducting a purchase transaction.

In step 204, a backend server system address and an identification code are obtained. In one embodiment, upon establishing an NFC communications link with the smart tag, the mobile device may wirelessly obtain a backend server system address and an identification code from the smart tag. In one embodiment, the identification code may identify either the touch point or the related electronic transaction terminal device.

In step 206, a communications link is established between the mobile device and the backend server system. In one embodiment, the mobile device utilizes the backend server system address obtained from the touch point to establish a channel of communication with the backend server system.

In step 208, an identification code and mobile device identifier is received. In one embodiment, the backend server system receives an identification code and a mobile device identifier from the mobile device via the established communications link.

In step 210, the identification code is used to provide an electronic certificate to a terminal device. In one embodiment, the backend server system may utilize the identification code to establish communication with the corresponding electronic transaction terminal device as well as to query a database to locate at least one electronic certificate which may be applicable to an electronic transaction being conducted with the mobile device. For example, the backend service system may receive a product identifier (of a product being purchased) from the electronic transaction terminal device. The backend server system may then use the product identifier and/or the mobile device identifier to query the electronic certificate database for an applicable electronic certificate or electronic certificate identifier (e.g., an electronic certificate that is associated with the product identifier and/or the mobile device identifier). After obtaining an appropriate electronic certificate, the backend server system may provide the electronic certificate to the identified electronic transaction terminal device that is associated with the identification code.

In step 212, the electronic certificate is applied to the electronic transaction. In one embodiment, the electronic certificate may be applied to the purchase transaction being conducted at the point of sale (e.g., at a cash register).

It will be understood that various details of the subject matter described herein may be changed without departing from the scope of the subject matter described herein. Furthermore, the foregoing description is for the purpose of illustration only, and not for the purpose of limitation.

What is claimed is:

1. A method for conducting an electronic transaction via a backend server system, the method comprising:
   interfacing a mobile device with a touch point to wirelessly obtain a backend server system address and an identification code, wherein the touch point is associated with an electronic transaction terminal device to be utilized by a user of the mobile device to conduct an electronic transaction and the identification code is associated with the electronic transaction terminal device or the touch point, wherein the electronic transaction terminal device is located at a point of sale;
   establishing communication between the mobile device and the backend server system using the backend server system address;
   receiving, at the backend server system from the mobile device, the identification code and a mobile device identifier associated with the mobile device;
   determining, by the backend server system, whether one or more electronic certificates associated with the mobile device identifier are applicable for use in the electronic transaction;
   using, by the backend server system, the identification code to provide at least one of the applicable electronic certificates to the electronic transaction terminal device; and
   applying, by the electronic transaction terminal device, the at least one applicable electronic certificate to the electronic transaction, wherein the electronic transaction includes a payment transaction for a product that is presented for purchase at a cash register located at the point of sale.

2. The method of claim 1 comprising, at the backend server system, identifying a mobile device application associated with the touch point, determining a transaction type associated with the electronic transaction, determining the location of the terminal device, and authenticating the mobile device.

3. The method of claim 2 wherein the mobile device application includes at least one of: a retail point of sale (POS) application, a healthcare service point application, a transportation service point application, a government service point application, an enterprise service point application, a support service point application, a kiosk service point application, an access control service point application, a banking application, an automatic teller machine (ATM) application, a boarding pass application, and an entertainment service point application.

4. The method of claim 1 wherein the identification code includes an electronic transaction terminal device identifier or a touch point identifier that is mapped to at least one of: an electronic transaction terminal device identifier, a mobile device application identifier, a banking terminal device identifier, an automatic teller machine (ATM) terminal device identifier, and a backend server identifier stored in the backend server system.

5. The method of claim 1 wherein the electronic transaction terminal includes at least one of: a point of sale (POS) terminal, a healthcare point of service terminal, a transportation point of service terminal, a government point of service terminal, an enterprise point of service terminal, a support point of service terminal, a kiosk point of service terminal, an access control point of service terminal, a banking point of service terminal, an automatic teller machine (ATM) point of service terminal, and an entertainment system point of service terminal, wherein the electronic transaction terminal is physically located near to the mobile device user at the time of the electronic transaction.

6. The method of claim 1 wherein the electronic transaction includes at least one of: a payment transaction, a loyalty transaction, a coupon redemption transaction, an offer redemption transaction, a digital receipt pickup transaction, an electronic coupon pickup transaction, an electronic coupon pickup transaction, a reward pickup transaction, a one-touch checkout transaction, an order transaction, and a non-payment transaction, a combination of payment and non-payment transaction, an electronic certificate delivery transaction, a printing advice transaction, an access control transaction, a boarding pass transaction, and an electronic certificate redemption transaction.

7. The method of claim 1 wherein the backend server system includes one or more of: a trigger management server (TMS), a content management server (CMS), a content provider server, an electronic certificate repository, and an over the air (OTA) provisioning server.

8. The method of claim 1 wherein the mobile device comprises a near field communications (NFC) enabled mobile device.

9. The method of claim 1 wherein the electronic transaction includes at least one of: a payment transaction, a loyalty transaction, a coupon redemption transaction, an offer redemption transaction, a digital receipt pickup transaction, an electronic coupon pickup transaction, an electronic coupon pickup transaction, a reward pickup transaction, a one-touch checkout transaction, an order transaction, and a non-payment transaction.

10. The method of claim 1 wherein the one or more electronic certificates includes one or more electronic coupons, electronic loyalty cards, electronic offers, electronic payment cards, electronic event or ride tickets, electronic rewards, a digital receipt, a payment identifier, a boarding pass, an electronic check-in identifier, an electronic hotel key, a membership key, an electronic gift card, an electronic prepaid card, and an electronic business card.

11. The method of claim 1 wherein interfacing a mobile device includes tapping a near field communications (NFC) enabled mobile device to an NFC tag.

12. The method of claim 11 comprising conducting authentication between an NFC application on the NFC enabled mobile device and the NFC tag.

13. The method of claim 12 comprising conducting authentication between a mobile device application on the mobile device and the QRcode or barcode.

14. The method of claim 1 wherein interfacing a mobile device includes utilizing a camera of the mobile device to scan a QRcode or bar code.

15. The method of claim 1 further comprising sending a message, to the mobile device or an email address associated with the user of the mobile device, which includes at least one of: a payment confirmation message, a transaction completion message, a digital receipt, a thank-you message, and an updated loyalty point total.

16. The method of claim 1 wherein at least one electronic certificate is sent to both the user associated with the mobile device and an account associated with the user that is hosted in the backend server system.

17. The method of claim 1 wherein the backend server system address includes a uniform resource locator (URL) address.

18. The method of claim 1 wherein the backend server system is configured to receive an email address from the mobile device and to provide the email address to the electronic transaction terminal device, wherein the electronic device uses the email address to send a digital receipt associated with the electronic transaction upon completion of the electronic transaction.

19. The method of claim 1 wherein interfacing the mobile device includes utilizing WiFi, Bluetooth, global positioning system (GPS), cellular triangulation, or WiFi triangulation to indicate a physical presence of the mobile device to a point of sale location or device.

20. A system for conducting electronic transactions, the system comprising:
an electronic transaction terminal device located at a point of sale and configured to apply at least one applicable electronic certificate to an electronic transaction, wherein the electronic transaction includes a payment transaction for a product that is presented for purchase at a cash register located at the point of sale;
a touch point configured to provide a backend server system address and an identification code to an interfacing mobile device, wherein the touch point is associated with the electronic transaction terminal device to be utilized by a user of the mobile device to conduct the electronic transaction and the identification code is associated with either the electronic transaction terminal device or the touch point; and
a backend server system configured to receive, from the mobile device using the backend server system address, a mobile device identifier associated with mobile device and the identification code, to determine whether one or more electronic certificates associated with the mobile device identifier are applicable for use in the electronic transaction, and to use the identification code to provide at least one of the applicable electronic certificates to the electronic transaction terminal device.

21. The system of claim 20 wherein the backend server system is further configured to identify a mobile device application associated with the touch point, determine a transaction type associated with the electronic transaction, determine the location of the electronic transaction terminal device, and authenticate the mobile device.

22. The system of claim 21 wherein the mobile device application includes at least one of: a retail point of sale (POS) application, a healthcare service point application, a transportation service point application, a government service point application, an enterprise service point application, a support service point application, a kiosk service point application, an access control service point application, a banking application, an automatic teller machine (ATM) application, a boarding pass application, and an entertainment service point application.

23. The system of claim 20 wherein the identification code includes an electronic transaction terminal device identifier or a touch point identifier that is mapped to at least one of: an electronic transaction terminal device identifier, mobile device application identifier, a banking terminal device identifier, an automatic teller machine (ATM) terminal device identifier, and a backend server identifier stored in the backend server system.

24. The system of claim 20 wherein the electronic transaction terminal includes at least one of: a point of sale (POS) terminal, a healthcare point of service terminal, a transportation point of service terminal, a government point of service terminal, an enterprise point of service terminal, a support point of service terminal, a kiosk point of service terminal, an access control point of service terminal, a banking point of service terminal, an automatic teller machine (ATM) point of service terminal, and an entertainment system point of service terminal, wherein the electronic transaction terminal is physically located near to the mobile device user at the time of the electronic transaction.

25. The system of claim 20 wherein the electronic transaction includes at least one of: a payment transaction, a loyalty transaction, a coupon redemption transaction, an offer redemption transaction, a digital receipt pickup transaction, an electronic coupon pickup transaction, an electronic coupon pickup transaction, a reward pickup transaction, a one-touch checkout transaction, an order transaction, and a non-payment transaction, a combination of payment and non-payment transaction, an electronic certificate delivery transaction, a printing advice transaction, an access control transaction, a boarding pass transaction, and an electronic certificate redemption transaction.

26. The system of claim 20 wherein the backend server system includes one or more of: a trigger management server (TMS), a content management server (CMS), a content provider server, an electronic certificate repository, and an over the air (OTA) provisioning server.

27. The system of claim 20 wherein the mobile device comprises a near field communications (NFC) enabled mobile device.

28. The system of claim 20 wherein the electronic transaction includes at least one of: a payment transaction, a loyalty transaction, a coupon redemption transaction, an offer redemption transaction, a digital receipt pickup transaction, an electronic coupon pickup transaction, an electronic coupon pickup transaction, a reward pickup transaction, a one-touch checkout transaction, an order transaction, and a non-payment transaction.

29. The system of claim 20 wherein the one or more electronic certificates includes one or more electronic coupons, electronic loyalty cards, electronic offers, electronic payment cards, electronic event or ride tickets, electronic rewards, a digital receipt, a payment identifier, a boarding pass, an electronic check-in identifier, an electronic hotel key, a membership key, an electronic gift card, an electronic prepaid card, and an electronic business card.

30. The system of claim 20 wherein the backend server system address and the identification code is provided to the mobile device in response to tapping the mobile device to an NFC tag.

31. The system of claim 20 further wherein the electronic transaction terminal device is further configured to send a message, to the mobile device or an email address associated with the user of the mobile device, which includes at least one of: a payment confirmation message, a transaction completion message, a digital receipt, a thank-you message, and an updated loyalty point total.

32. The system of claim 20 wherein the electronic transaction terminal device is further configured to send at least one electronic certificate to both the user associated with the mobile device and an account associated with the user that is hosted in the backend server system.

33. The system of claim 20 wherein the backend server system address includes a uniform resource locator (URL) address.

34. The system of claim 20 wherein the backend server system is configured to receive an email address from the mobile device and to provide the email address to the electronic transaction terminal device, wherein the electronic device uses the email address to send a digital receipt associated with the electronic transaction upon completion of the electronic transaction.

35. A non-transitory computer readable medium comprising computer executable instructions embodied in a computer readable medium that when executed by a processor of a computer control the computer to perform steps comprising:
  interfacing a mobile device with a touch point to wirelessly obtain a backend server system address and an identification code, wherein the touch point is associated with an electronic transaction terminal device to be utilized by a user of the mobile device to conduct an electronic transaction and the identification code is associated with the electronic transaction terminal device or the touch point, wherein the electronic transaction terminal device is located at a point of sale;
  establishing communications between the mobile device and the backend server system using the backend server system address;
  receiving, ty the backend server system from the mobile device, a mobile device identifier associated with the mobile device and the identification code;
  determining, ty the backend server system, whether one or more electronic certificates associated with the mobile device identifier are applicable for use in the electronic transaction;
  using the identification code to provide at least one of the applicable electronic certificates to the electronic transaction terminal device; and
  applying, by the electronic transaction terminal device, the at least one applicable electronic certificate to the electronic transaction, wherein the electronic transaction includes a payment transaction for a product that is presented for purchase at a cash register located at the point of sale.

* * * * *